(12) United States Patent
Li

(10) Patent No.: US 10,934,023 B2
(45) Date of Patent: Mar. 2, 2021

(54) IMAGE RECOGNITION FOR VEHICLE SAFETY AND DAMAGE INSPECTION

(71) Applicant: PANTON, INC., Houston, TX (US)

(72) Inventor: Saishi Frank Li, Sugar Land, TX (US)

(73) Assignee: Saishi Frank Li, Austin, TX (US)

( * ) Notice: Subject to any disclaimer, the term of this patent is extended or adjusted under 35 U.S.C. 154(b) by 88 days.

(21) Appl. No.: 16/226,053

(22) Filed: Dec. 19, 2018

(65) Prior Publication Data
US 2019/0185186 A1 Jun. 20, 2019

Related U.S. Application Data

(60) Provisional application No. 62/607,763, filed on Dec. 19, 2017.

(51) Int. Cl.

| | |
|---|---|
| *B64F 5/60* | (2017.01) |
| *G05D 1/02* | (2020.01) |
| *B64D 45/00* | (2006.01) |
| *G08G 5/00* | (2006.01) |
| *G07C 5/08* | (2006.01) |
| *G06T 17/00* | (2006.01) |
| *G06T 7/00* | (2017.01) |
| *B64C 39/02* | (2006.01) |
| *G05D 1/10* | (2006.01) |

(52) U.S. Cl.
CPC ............. *B64F 5/60* (2017.01); *B64C 39/024* (2013.01); *B64D 45/00* (2013.01); *G05D 1/0202* (2013.01); *G05D 1/101* (2013.01); *G06T 7/001* (2013.01); *G06T 17/00* (2013.01); *G07C 5/085* (2013.01); *G07C 5/0808* (2013.01); *G07C 5/0816* (2013.01); *G08G 5/006* (2013.01); *G08G 5/0013* (2013.01); *G08G 5/0026* (2013.01); *G08G 5/0034* (2013.01); *G08G 5/0043* (2013.01); *G08G 5/0069* (2013.01); *B64C 2201/123* (2013.01); *B64C 2201/127* (2013.01); *B64C 2201/141* (2013.01); *B64D 2045/0085* (2013.01); *G06T 2207/20081* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 9,639,960 | B1 * | 5/2017 | Loveland | G01C 11/02 |
| 9,805,261 | B1 * | 10/2017 | Loveland | G06K 9/00637 |
| 9,823,658 | B1 * | 11/2017 | Loveland | G05D 1/0094 |
| 9,886,632 | B1 * | 2/2018 | Loveland | G06T 5/008 |
| 2018/0330528 | A1 * | 11/2018 | Loveland | G01C 21/206 |
| 2018/0357932 | A1 * | 12/2018 | Zavesky | B64C 39/02 |

* cited by examiner

*Primary Examiner* — Richard M Camby
(74) *Attorney, Agent, or Firm* — Patterson + Sheridan, LLP

(57) ABSTRACT

The disclosure provides an approach for performing inspections. An image analysis application is configured to receive sensor data captured at least by one or more sensors mounted on a first unmanned aerial vehicle (UAV) flying along at least one programmed flight pattern. The image analysis application is further configured to normalize the sensor data, and determine anomalies based, at least in part, on differences between the normalized sensor data and sensor data previously captured at least by one or more sensors mounted on a second UAV flying along the at least one programmed flight pattern. In addition, the image analysis application is configured to generate a report indicating the determined anomalies.

21 Claims, 5 Drawing Sheets

IMAGE RECOGNITION FOR VEHICLE SAFETY AND DAMAGE INSPECTION

CROSS-REFERENCE TO RELATED APPLICATIONS

This application claims priority to U.S. provisional application having Ser. No. 62/607,763, filed on Dec. 19, 2017, which is hereby incorporated by reference in its entirety.

BACKGROUND

Field

The present disclosure relates generally to image processing systems, and more particularly, to methods and apparatuses for vehicle safety and damage inspections.

Description of Related Art

All aircraft are required to be periodically inspected by trained mechanics, and the Federal Aviation Administration (FAA) recommends certain inspections before each flight. Commercial aircraft have more stringent inspection requirements than non-commercial aircraft.

A pre-flight inspection of aircraft by maintenance crew (or by pilots or other task groups) typically includes visually checking the structural integrity of control surfaces by examining nuts, bolts, screws, and rivets of the aircraft. Inspectors may also check an aircraft's surfaces for dents, cracks, cleanliness from icing and snow, lightning strike damage, and leakage problems. However, traditional pre-flight checks are not exhaustive. For example, some parts of an aircraft may be unreachable by inspection crews, and weather conditions may prevent certain inspections from being performed. Problems can also be missed during manual aircraft inspections, even if inspection procedures have been well defined and followed. In addition to not always being reliable, traditional aircraft inspections are not cost effective, as they tend to be time and labor intensive.

Some vehicles other than aircraft also require visual inspections. For example, semi-trailer trucks are typically inspected by truck drivers. However, like aircraft inspections, manual inspections of other vehicles can be unreliable and not cost effective.

BRIEF SUMMARY

One embodiment provides a method for performing inspections. The method generally includes receiving sensor data captured at least by one or more sensors mounted on a first unmanned aerial vehicle (UAV) flying along at least one programmed flight pattern. The method further includes normalizing the sensor data, and determining anomalies based, at least in part, on differences between the normalized sensor data and sensor data previously captured at least by one or more sensors mounted on a second UAV flying along the at least one programmed flight pattern. In addition, the method includes generating a report which indicates the determined anomalies.

Further embodiments provide a non-transitory computer-readable medium that includes instructions that, when executed, enable a computer to implement one or more aspects of the above method, and a computer system programmed to implement one or more aspects of the above method.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
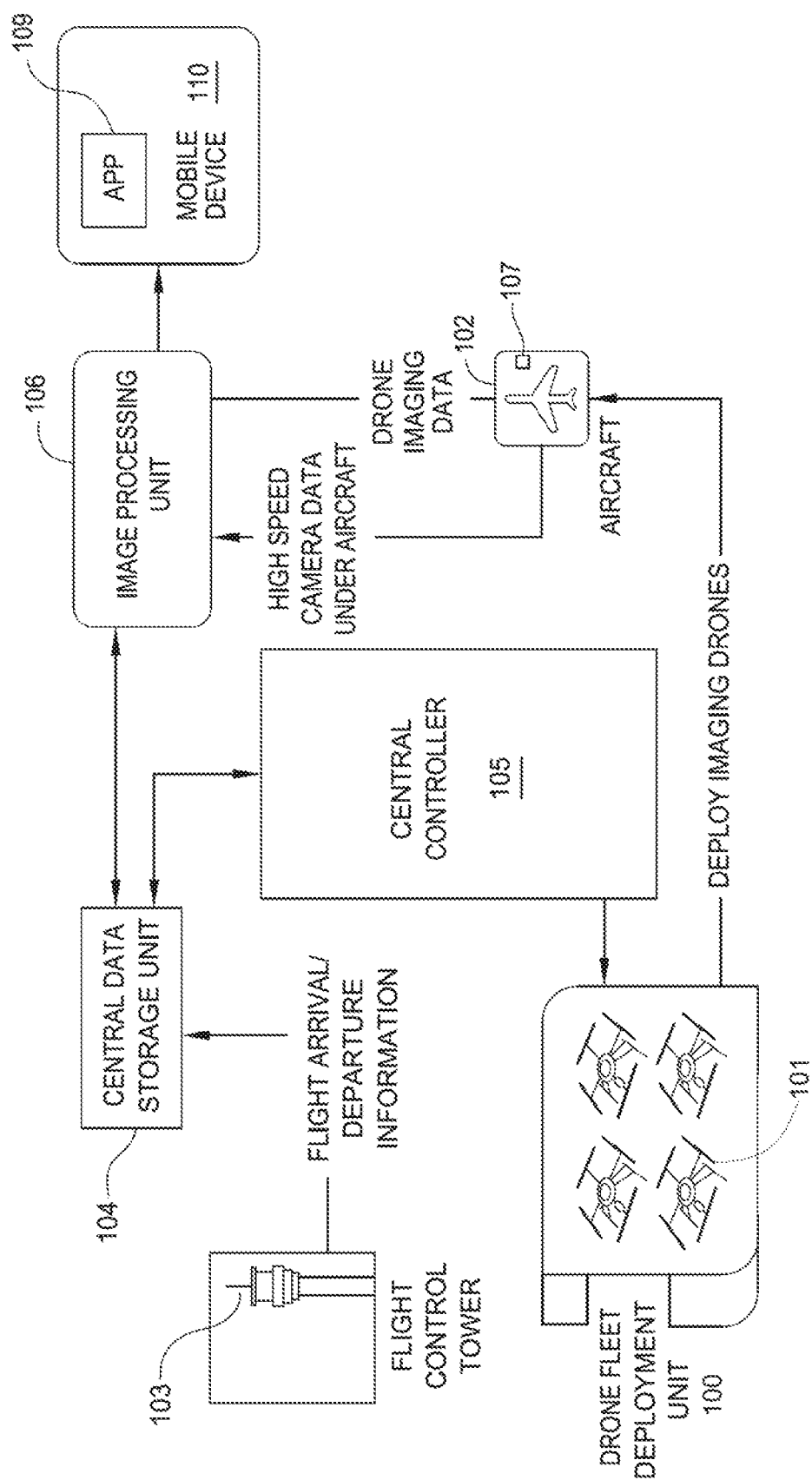
FIG. 1 illustrates an approach for inspecting aircraft using unmanned aerial vehicles (UAVs), according to an embodiment.

Embodiments of the present disclosure provide apparatuses, methods, processing systems, and computer readable media for applying image analysis and machine learning techniques to images, such as images collected using unmanned aerial vehicles (UAVs), in order to generate safety inspection reports. Although aircraft and trucks are used herein as reference examples of vehicles for which safety inspection reports may be generated, techniques disclosed herein are also applicable to other types of vehicles, such as ships, and even objects in general.

Herein, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., an image analysis application) or related data available in the cloud. For example, an image analysis application could execute on a computing system in the cloud and process received images, as well as generate and store inspection reports, according to techniques disclosed herein. Doing so allows a user to access this information from any computing system attached to a network connected to the cloud (e.g., the Internet).

FIG. 1 illustrates an approach for inspecting aircraft using unmanned aerial vehicles, according to an embodiment. As shown, one or more unmanned aerial vehicles 101 are deployed from a fleet deployment unit 100 to capture image data of an aircraft 102. The fleet deployment unit 100 may be any suitable facility, such as an airport hangar, that houses and deploys UAVs, including the UAV(s) 101. Image data of the aircraft 102 captured by the UAV(s) 101 is used to determine if the aircraft 102 has been damaged since a previous inspection, in contrast to traditional aircraft inspections that required maintenance crew, pilots, and/or other ground personnel to manually inspect aircraft.

Aircraft flight information, such as arrival and departure information, flight histories, and/or the current locations of aircraft, is transmitted from a flight control tower 103 to a central data storage unit 104, where the flight information is stored. A central controller 105 is responsible for controlling UAVs to capture images of aircraft based on the stored flight information and known dimensions of the aircraft, which may be provided by, e.g., a manufacturer's specifications. As shown, the central controller 105 retrieves the aircraft's 102 location and dimensions from the central data storage unit 104. The central controller 105 then programs the UAV(s) 101 with flight path(s) based on the aircraft's 102 location and dimensions. For example, the central controller 105 may include a flight path programming module that generates the flight path(s) and programs the UAV(s) 101. Each of the flight path(s) may include a path to reach the aircraft 102, as well as one or more patterns to fly with respect to the aircraft 102. The flight pattern(s) themselves may specify elevations, distances, and/or angles from which to capture images of the aircraft 102, and multiple such flight pattern(s) for different types of aircraft may be stored in and retrieved from the central data store 104. Image data will then be captured from specific vantage points and angles with respect to the aircraft 102 as the UAV(s) 101 fly along their programmed flight path(s).

In one embodiment, UAV(s) are programmed to fly according to the same flight pattern(s) during each inspection of the same aircraft, after the UAV(s) have arrived at the aircraft. By flying along the same flight pattern(s), image data may be captured from substantially the same angles and distances during each inspection, and such image data may then be compared across different UAV flights.

In one embodiment, images captured by the UAV(s) 101 are sequentially uploaded to a server or the cloud for processing. Illustratively, as the UAV(s) 101 collect image data, the UAV(s) 101 upload the image data to an image processing unit 106, which may be an image processing application or execute such an application, as discussed in greater detail below. Doing so creates a flow of image data from the UAV(s) 101 to the image processing unit 106. The image data may be transmitted in any suitable manner, such as using radio communication, Wi-Fi, Bluetooth, cellular telecommunication, or the like. In another embodiment, image data may be uploaded in bulk. In such a case, image data may be transmitted to the image processing unit 106 after the UAV(s) 101 have completed their flight path(s) and collected the image data. For example, bulk uploading may occur after the UAV(s) 101 have landed and rely on, e.g. a hardware connection to transmit the image data to the image processing unit 106.

As shown, an (optional) camera 107 that is distinct from the UAV(s) 101 collects image data of the underside of the aircraft 102. The camera 107 is included to be representative of one or more physical cameras. In one embodiment, the camera 107 is a stationary camera array that the aircraft 102 drives over. In another embodiment, the camera 107 may be part of a moveable assembly that maneuvers under the aircraft 102 while the aircraft 102 is stationary. In some embodiments, the camera 107 includes one or more high-speed cameras used to capture image data from designated angles and distances. Similar to the UAV image data discussed above, image data captured by the camera 107 during an inspection may correspond to image data captured in a similar manner during previous inspections, and such corresponding image data may be compared to identify anomalies. In addition, the camera 107 may capture image data that is sequentially transmitted to the image processing unit 106 after each image's capture, or the captured image data may be transmitted in a bulk upload to the image processing unit 106 after all image data has been captured.

In yet another embodiment, an array of cameras may be used in lieu of the UAV(s) 101 and the camera 107 to capture images of vehicles, such as aircraft, and transmit the captured image data to the image processing unit 106. The camera array may include, for example, cameras that are positioned at strategic locations and capable of capturing 360 degree image data of vehicles passing across the camera array. For example, the camera array may include cameras placed inside a hangar that aircraft can enter, cameras placed along a pavement that trucks can drive across, cameras places along a waterway that ships can sail across, or the like.

After receiving image data captured by cameras mounted on the UAV(s) 101 and the camera 107 (or a camera array), the image processing unit 106 normalizes the received images, and the image processing unit 106 then compares the normalized images to corresponding image(s) captured during previous inspection(s) in order to detect anomalies. The normalization process prepares each of the captured images for comparison by correcting angles and positions of the image, thereby aligning the image to substantially match corresponding reference image(s) from one or more previous inspections. That is, the normalization process rotates and resizes each image to align with corresponding reference image(s) from the previous inspection(s). In another embodiment, the normalization may also include removing lighting condition effects.

Each normalized image is compared with corresponding reference image(s) from previous inspection(s) to detect differences therein, which are treated as anomalies that may represent damage the aircraft 102 has sustained since the previous inspection(s). In one embodiment, the comparison includes a block-by-block comparison in which blocks of pixels in each image are compared to corresponding blocks of pixels in the reference image(s) from the previous inspection(s), as discussed in greater detail below. The reference image(s) from the previous inspection(s) may be retrieved from the central data storage 104, or elsewhere. For example, the reference image(s) may be stored in the central data storage 104 along with an aircraft identifier number (ID) and retrieved using the aircraft ID. After images from the current inspection have been normalized, the normalized images (and/or the un-normalized images) may also be stored in the central data storage 104, along with the same aircraft ID, for use in future comparisons.

In addition to making image comparisons, the image processing unit 106 also generates a 3D model representation of the aircraft 102 in one embodiment. The image processing unit 106 may use, e.g., triangulation to generate such a 3D model. Triangulation works on the principle that a point's location in three-dimensional (3D) space can be recovered from images depicting that point from different angles. In one embodiment, the image processing unit 106 determines portions of the captured images that overlap and recovers 3D locations of points in those overlapping portions. In particular, the image processing unit 106 may compute features (e.g., color, shape, thickness, etc.) of points in each of the received images and determine matching points in other received images based on a matching of features of those points. Any suitable features, such as RANSAC (Random Sample Consensus) features, may be used. Having determined the location of a given point in at least three images, the image processing unit 106 may then use known positions (e.g., GPS coordinates) from which the images were taken and triangulation to determine the given point's location in 3D space. By repeating this process for multiple points, the image processing unit 106 may generate a 3D point cloud. In one embodiment, the image processing unit 106 further adds texture to the 3D point cloud by extracting the texture and color of each of the points in the received images, averaging over neighboring points, and applying the averaged texture and color to the 3D point cloud (or other model). Other modeling techniques may also be employed, as appropriate.

In addition to comparing captured images with corresponding reference image(s) to detect differences therein, the image processing unit 106 may also be configured to classify what those differences represent. For example, the image processing unit 106 may automatically distinguish between different types of anomalies such as cracks, dents, other surface anomalies, ice build-up, fluid leaks, etc. In one embodiment, the image processing unit 106 utilizes a machine learning model that is trained to predict classifications of various types of anomalies represented by differences between images (which may itself be represented as an image depicting the differences). An example of such a machine learning model is described in U.S. patent application Ser. No. 16/142,620, entitled Image Recognition System for Rental Vehicle Damage Detection and Management and filed on Sep. 26, 2018, which is incorporated by reference herein in its entirety. It should be noted, however, that other machine learning models, such as convolution neural networks, region proposal networks, deformable parts models, and the like may also be used.

After analyzing the captured image data, the image processing unit 106 generates a report indicating the analysis results. The report may be in any suitable form, such as a .pdf file, a webpage, etc. In one embodiment, the report indicates the detected anomalies (and their classifications if different types of anomalies are classified using machine learning), and the report may further indicate where the anomalies are located (e.g., using the 3D model described above). In addition, the report may include some or all of the original images depicting the anomalies. Illustratively, the image processing unit 106 pushes the report to an application 109 running in a user's (e.g., a pilot, maintenance crew member, etc.) mobile device 110. The mobile application 109 may provide any suitable user interface for accessing the report, such as a graphical user interface (GUI) with a plurality of screens. In addition to specifying the detected anomalies, the GUI in one embodiment includes an image preview screen that shows previews of the captured images and allows the user to select images to view in full, as well as an auxiliary input screen that allows the user to type in additional information such as location, time, materials, conditions, and/or image notes, etc. It should be understood that a user of the mobile application 109 who receives the report may manually examine the anomalies identified in the report, repair any identified damage, etc., as appropriate.

Figure 2:
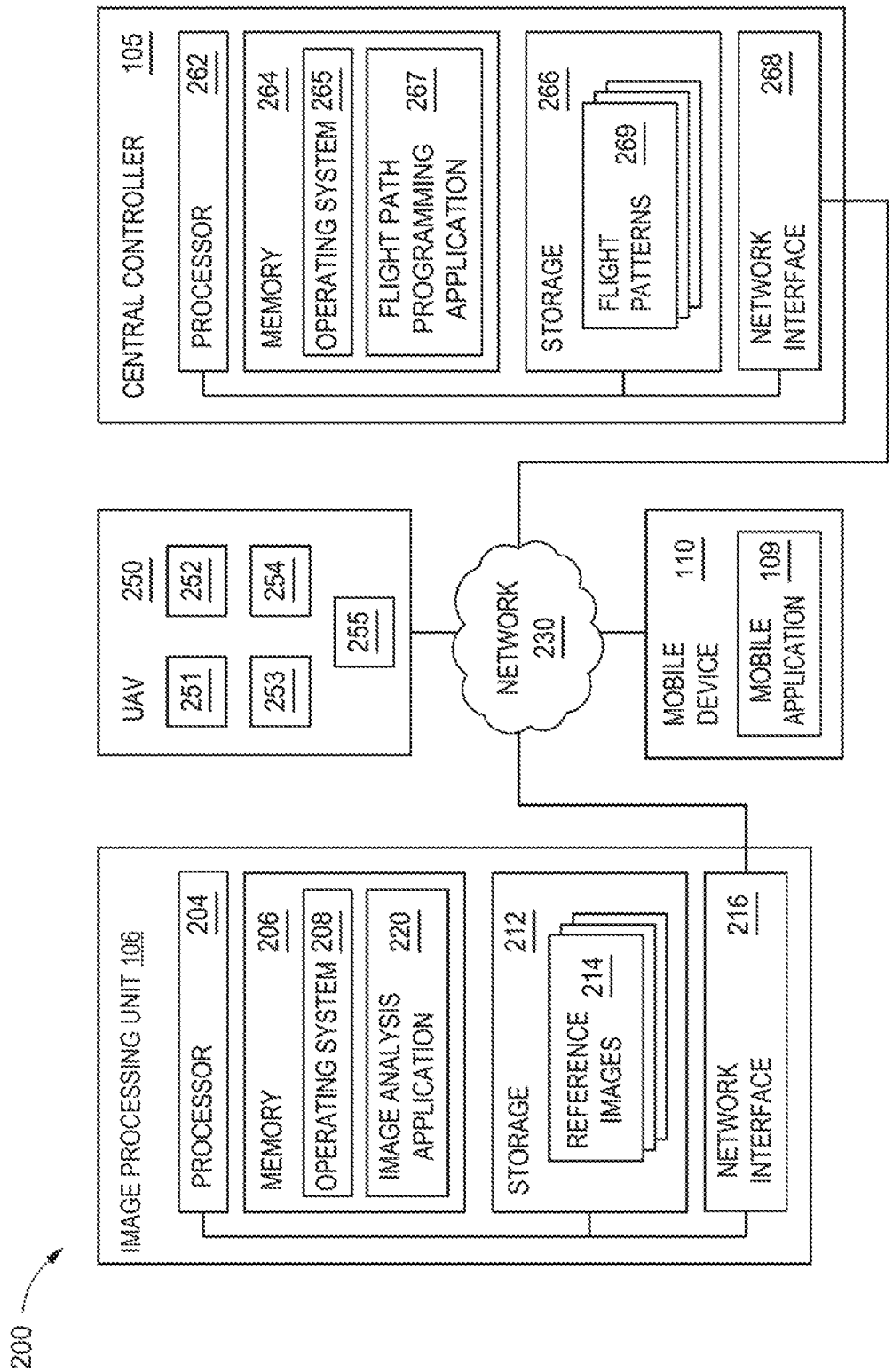
FIG. 2 illustrates a system in which an embodiment may be implemented.

FIG. 2 illustrates a system 200 in which an embodiment may be implemented. The system 200 may be used to detect and report anomalies, such as those that appear in images captured of the aircraft 102 described above. As shown, the system 200 includes the image processing unit 106 in the form of a computing system that is in communication with a UAV 250, mobile devices 110, and the central controller 105 that is another computing system, via a telecommunication network 230. The network 230 may be a telecommunications network and/or a wide area network (e.g., the Internet). Although one network 230 is shown for illustrative purposes, it should be understood that multiple networks may also be used. In some embodiments, the image processing unit 106, the UAV 205, the mobile devices 110, and/or the central controller 105 may also communicate using any other suitable means (e.g., the UAV 250 may utilize radio communications and not be connected to a network).

Illustratively, the image processor system 106 is a server that includes a processor 204 connected via a bus to a memory 206, storage 212, and a network interface 216. The image processing unit 106 runs an operating system 208, examples of which include the UNIX® operating system, versions of the Microsoft Windows® operating systems, and distributions of the Linux® operating system. The processor 204 is included to be representative of a single central processing unit (CPU), multiple CPUs, a single CPU having multiple processing cores, one or more graphic processing units (GPUs), some combination of CPU(s) and GPU(s), and/or any other suitable processor(s). The memory 206 may be a random access memory. The network interface device 216 may be any type of network communication device allowing the image processing unit 106 to communicate with other devices via the network 230.

Illustratively, the memory 206 includes an image analysis application 220. The image analysis application 220 provides a software application configured to receive image data from the UAV's 250 image capturing devices 251-255 and process the image data to detect anomalies that may be indicative of damage to aircraft. In one embodiment, the image analysis application 220 is configured to normalize received images captured by the UAV's 250 image capturing devices 251-255 during an inspection of an aircraft, detect anomalies based, at least in part, on differences between the normalized images and corresponding reference images 214 taken during previous inspections of the same aircraft and stored in the storage 212 (or elsewhere), and push a report to the application 109 running in the handheld device 110 indicating the detected anomalies. Although shown as running in the image processing system 106 that is a server, it should be understood that the image analysis application 220 may generally run in any physical or virtual computing system(s), including in a public cloud (e.g., Amazon Web Services® (AWS) or Microsoft Azure®) shared by tenants from separate organizations, a private cloud owned and used by a single organization, or a hybrid cloud.

As shown, the UAV 250 includes several image capturing devices including a high resolution camera 251, an ultrasonic camera 252, a thermal camera 253, an ultraviolet light camera 254, and other cameras 255. Although one UAV 250 is shown for illustratively purposes, any number of UAVs may be used to capture image data of aircraft. Each UAV may generally include any suitable configuration of cameras and/or other sensors. For example, a UAV may include one or more of the cameras 251-254, or the UAV may not include each type of camera 251-254. The high resolution camera 251 is a digital camera that captures RGB (red, green, blue) images of an aircraft's surface using visible light. The resolution of the camera 251 should be high enough to clearly capture desired anomalies, such as dents and other damage to the body surface of aircraft. The ultrasonic camera 252 uses sound waves to measure distances to aircraft that can be used to generate images. Ultrasonic camera images may be useful for, e.g., determining an aircraft's body integrity and any leakage, such as cracks, dents, surface anomalies, lightning damage, etc. The thermal camera 253 captures images using infrared radiation, and such images may be useful for, e.g., determining leakage as well as ice and snow accumulation on an aircraft's surfaces. The ultraviolet (i.e., black light) light camera 254 captures images using ultraviolet light, and such images may be useful for, e.g., determining leakage of antifreeze and de-icing fluid systems, pitot tubes, and other plastic parts that glow under ultraviolet light.

As shown, the central controller 105 is also a server (but functionality thereof may generally be implemented in any physical or virtual computing system, including in a public, private, or hybrid cloud) that includes a processor 262 connected via a bus to a memory 264, storage 266, and a network interface 268. The central controller 105 runs an operating system 265, which may be the UNIX® operating system, a version of the Microsoft Windows® operating system, a distribution of the Linux® operating system, or the like. The processor 262 is included to be representative of a single central processing unit (CPU), multiple CPUs, a single CPU having multiple processing cores, one or more graphic processing units (GPUs), some combination of CPU(s) and GPU(s), and/or any other suitable processor(s). The memory 264 may be a random access memory. The network interface device 268 may be any type of network communication device allowing the central controller 105 to communicate via the network 230.

Illustratively, the memory 264 includes a flight path programming application 267. The flight path programming application 267 is a software application configured to program UAVs with flight path instructions. In one embodiment, the flight path programming application 267 is configured to retrieve physical dimensions and a location of an aircraft (e.g., from a storage such as the central data storage 104 based on an aircraft ID number that can be used to determine the type of aircraft), and the flight path programming application 267 determines a flight path based on such information. Alternatively, the flight path programming application 267 may construct a flight path based in part on stored information, such as one of the flight patterns 269 that is stored in the storage 266 or in the central data storage 104, which may be identified using an aircraft ID number that is associated with a type of the aircraft. It should be noted that different flight patterns around an aircraft may be utilized for different types of aircraft, which may be of different shapes and sizes, and a flight pattern around an aircraft may be combined with a flight path that takes the UAV 250 safely to the aircraft. Each of the flight patterns 269 may further be constructed to ensure compliance with relevant government regulations, if any. After the flight path, including the path to the aircraft and flight pattern(s) around the aircraft, has been determined, the flight path programming application 267 programs the UAV with instructions to fly along the flight path 269. In other embodiments, the UAV may be piloted manually, such as along substantially the same flight path determined by the flight path programming application 267. For example, the UAV may be dispatched and manually operated by a UAV pilot with line-of-sight to the aircraft, dispatched and operated with automated flight control by the UAV pilot with line-of-sight, or dispatched and operated (manually or automatically) by a UAV pilot in a control room without line-of-sight to the aircraft.

Figure 3:
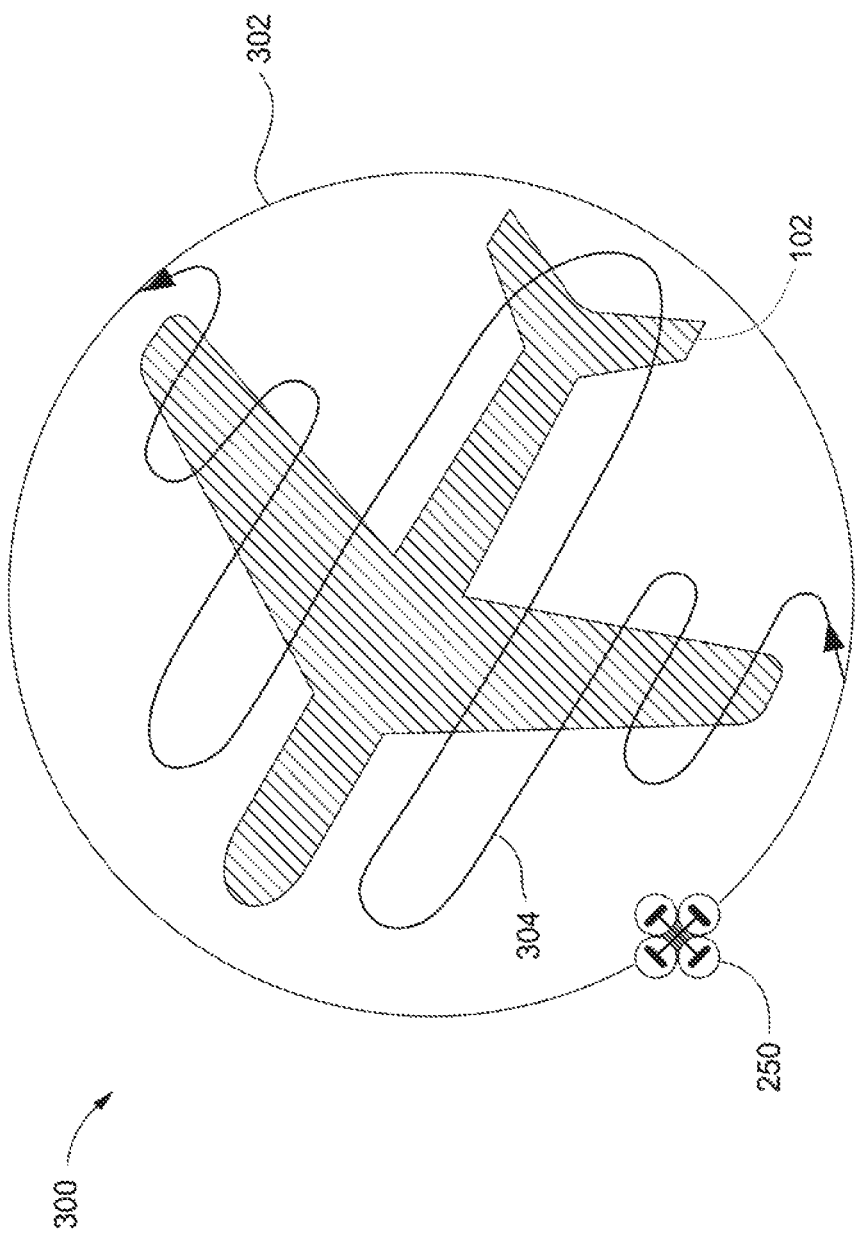
FIG. 3 illustrates an example flight path of a UAV around an aircraft, according to an embodiment.

FIG. 3 illustrates an example flight path 300 of the UAV 250 around the aircraft 102, according to an embodiment. As shown, the flight path 300 includes a circular perimeter flight pattern 302 and a zig-zag flight pattern 304. In one embodiment, the perimeter flight pattern 302 starts from the front of the aircraft 102, which may be automatically determined (e.g., using feature identification or classification by a machine learning model) or manually specified, and the UAV 250 then flies in a 360 degree circular pattern around the aircraft 102 with a camera angle at approximately 40 to 45 degrees to the ground. Doing so allows the image capturing devices 251-255 of the UAV 250 to acquire images around the entire aircraft 102. When capturing images during the perimeter flight pattern 302, the UAV 250 may also process the captured images and flight pattern to ensure edges of the aircraft 102 appear in every image and to keep the entire aircraft 102 in each image frame. For example, the UAV 250 may adjust the pre-programmed flight path due to the shape of the aircraft 102 or obstructions in the flight path, and multiple passes may be needed in some cases. In some embodiments, multi-perimeter flight patterns may be used to fly around different portions of the aircraft 102 separately rather than flying one larger perimeter flight pattern that might place the UAV 250 farther than desired for image capture from the aircraft 102.

In the zig-zag flight pattern 304, the UAV flies back and forth across portions of the airplane to capture images at closer distances than those captured with the circular perimeter flight pattern 302. In one embodiment, each of the images captured during the zig-zag flight pattern 304 covers two thirds of the area of a previously captured image to facilitate stitching of the images together (e.g., in a 3D model). A survey of the entire aircraft 102 may be implemented using the zig-zag pattern 304 along with overlapping image capture. The height that the UAV 250 flies during the zig-zag pattern 304 maybe, e.g., within 10 feet of the highest point of the aircraft 102, at a camera angle of 90 degrees to ground, and include the image overlap of two thirds.

Figure 4A:
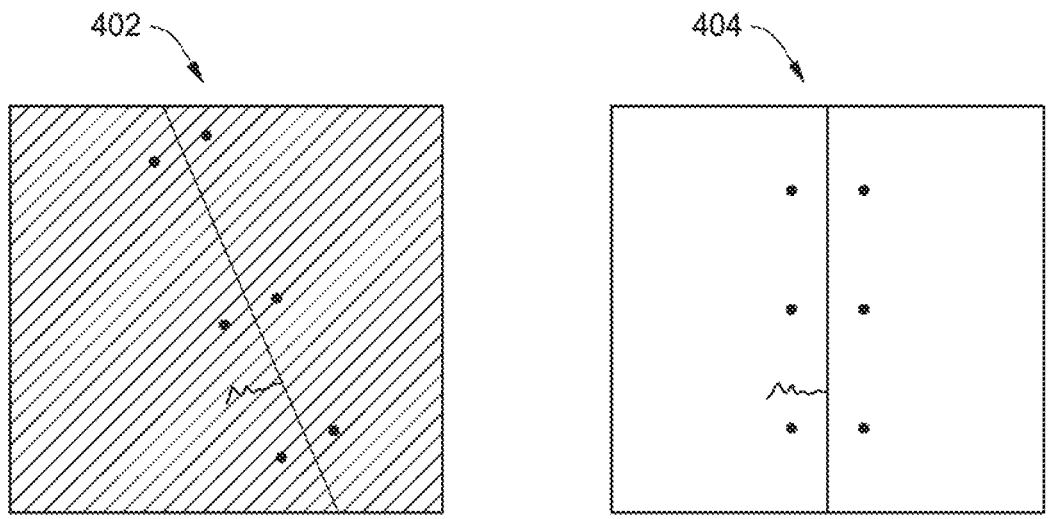
FIG. 4A illustrates normalizing a captured image, according to an embodiment.

FIG. 4A illustrates normalizing a captured image, according to an embodiment. As shown, an image 402 captured using a camera mounted on a UAV is normalized to align with corresponding reference image(s) that were captured (and stored) during previous inspections using a UAV flying along substantially the same flight pattern(s) around an aircraft. The normalization applied to match the image 402 with the corresponding reference image(s) may include transforming the image 402 through scaling, translation, rotation, skew, and the like to correct for differences in camera angle and position, thereby producing a normalized image 404. For example, the image analysis application 220 may transform the image 402 by matching features (e.g., RANSAC features) of pixels and/or regions in the received image to features in a corresponding reference image, determining a homography mapping between the image 402 and a reference image that takes the matching features in the received image to the matching features in the reference image, and applying the homography mapping to transform the image 402. In one embodiment, features are computed for certain points of interest, such as corners and junctions that are visually salient. In another embodiment, the normalization may further include adjusting pixel values of the image 402 to correct for differences in color/lighting conditions between the received image and the reference image. In such a case, the image analysis application 220 may adjust values of pixels in the received image to correct for differences in color/lighting conditions by, e.g., adjusting the pixel values so that a histogram of such values for the image 402 matches a histogram for the corresponding reference image. In another embodiment, the image analysis application 220 may use a reference image taken at a similar time of day as the image 402 so that color/lighting conditions are similar to begin with, and images may also be captured with the help of artificial lighting at night.

Figure 4B:
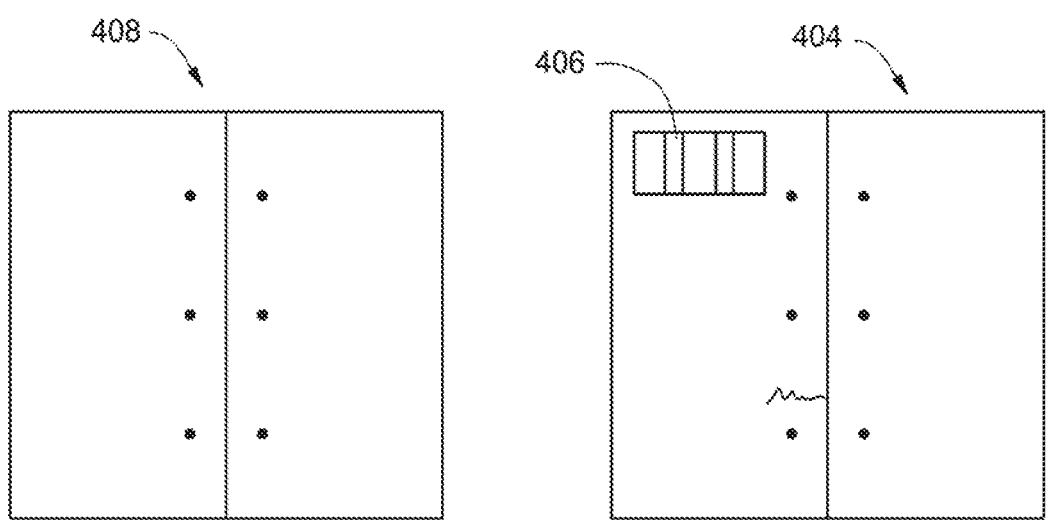
FIG. 4B illustrates the image comparison process, according to an embodiment.

FIG. 4B illustrates the image comparison process, according to an embodiment. As shown, the image analysis application 220 running in the image processing unit 106 compares the normalized image 404 with a corresponding reference image 408 from a previous inspection on a block-by-block basis in which blocks of pixels, such as the block 406, are compared to corresponding blocks in the reference image(s), and the block comparison repeats for all other blocks in a sliding-window manner. Any suitable block size may be used, such as 32×32 pixel blocks. The image analysis application 220 may identify differences between the compared blocks using any suitable technique, such as a normalized cross correlation in the Fourier domain, which is faster to compute and handles lighting differences better than a simple subtraction (which may also be used). In one embodiment, the image analysis application 220 first searches, in a predefined area around the location of the block in the normalized image 404, for a most closely matching block in the reference image 408, and then compares the normalized image block with the most closely matching block. Such a search allows blocks corresponding to the same regions of the vehicle to be compared, even when the normalization process does not perfectly align the image 402 with the reference image 408. The determined differences between the normalized image 402 and the reference image represent 408 anomalies that may include damage to the aircraft since the previous inspections. In another embodiment, a machine learning model may be trained and thereafter used to identify different types of anomalies, such as cracks, dents, other surface anomalies, ice build-up, fluid leaks, etc.

In one embodiment, the image analysis application 220 generates a report indicating the determined differences. For example, cracks, dents, and other anomalies that are determined through the comparison process may be indicated with bounding boxes showing the locations of those anomalies in the image 402 (or the normalized image 404). Where the image analysis application 220 employs a machine learning model to classify the type of damage that each identified anomaly represents, the image analysis application 220 may also include tags in the report indicating the types of damage predicted by the machine learning model. A user viewing the report may then manually inspect the anomalies indicated therein, repair any damage, etc.

Figure 5:
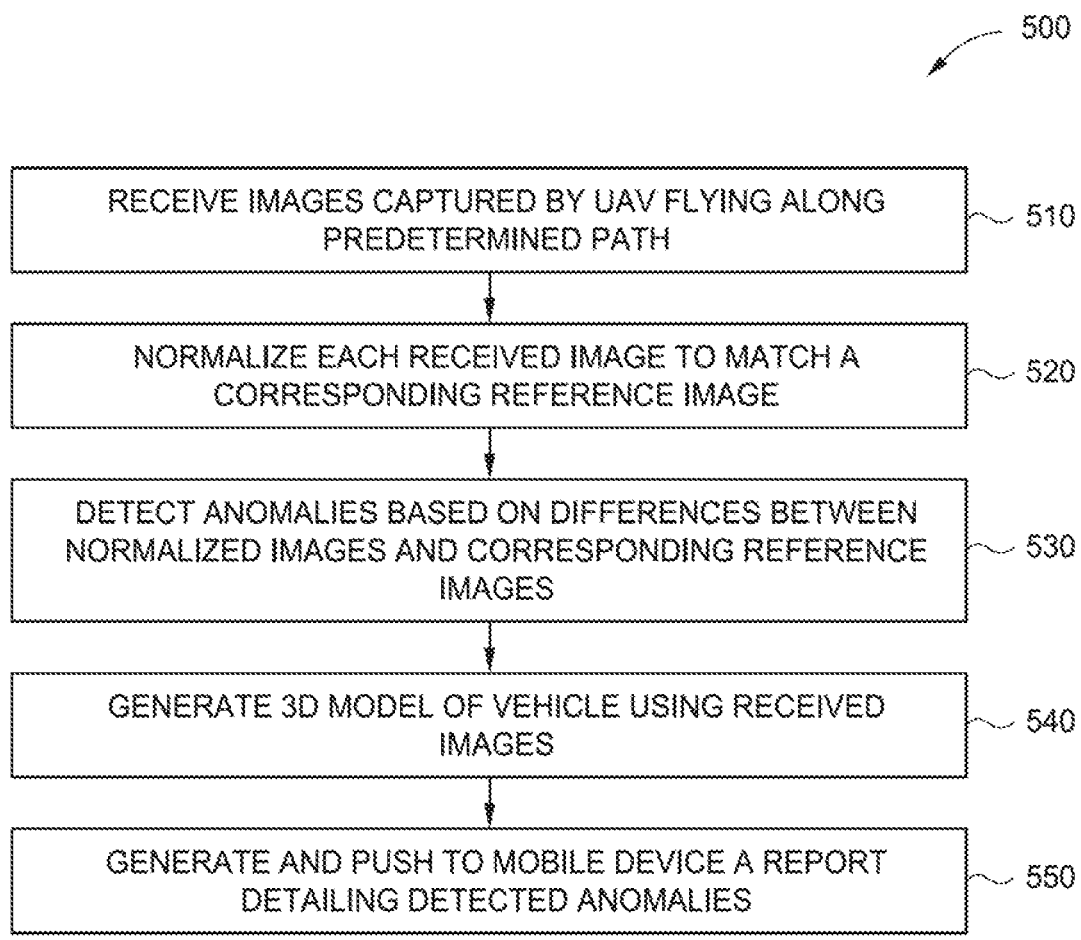
FIG. 5 illustrates a method for inspecting a vehicle using captured images, according to an embodiment.

FIG. 5 illustrates a method 500 for inspecting a vehicle using captured images, according to an embodiment. As shown, the method 500 begins at step 510, where the image analysis application 220 receives images captured by image capturing devices mounted on a UAV. The image capturing devices may include one or more high resolution cameras, ultrasonic cameras, thermal cameras, and ultraviolet light cameras, such as the cameras 251-255 described above with respect to FIG. 2. Additionally, the UAV may fly to and around the vehicle (e.g., an aircraft) according to a predetermined flight path, including a flight path to reach the aircraft and one or more flight patterns around the aircraft such those shown in FIG. 3. In particular, the flight pattern(s) around the aircraft may be the same flight pattern(s) flown during previous inspection(s) in order to acquire images that correspond to, and can be compared with, reference images taken during those previous inspection(s). Images captured during the flight of the UAV 250 may be transmitted to the image processing unit 106, in which the image analysis application 220 runs, in any suitable manner, including sequentially as images are captured or in bulk after the UAV 250 flight is completed and the UAV 250 has landed.

Although described with respect to receiving images captured by image capturing devices mounted on a UAV, the image analysis application 220 may also receive images captured by other image capturing devices in some embodiments. As described, such images may include captured by one or more cameras that collect image data of the underside of a vehicle, images captured by an array of cameras placed at strategic locations (e.g., in an aircraft hangar) and capable of capturing 360 degree image data of a vehicle passing across the camera array, etc.

At step 520, the image analysis application 220 normalizes each received image to match a corresponding reference image. As described, the corresponding reference image may be a stored image taken by a UAV-mounted camera during a previous inspection from substantially the same location and vantage point with respect to the same aircraft. In one embodiment, the images used as reference images are updated after each inspection. Although described with respect to one corresponding reference image, the image analysis application 220 may also normalize each received image to match multiple corresponding reference images that were previously taken during different inspections. Doing so can help identify historical evolutions of the aircraft over time. In one embodiment, the normalization that is applied to match a received image with a corresponding reference image includes identifying points in the received image and corresponding points in the reference image, determining a homography mapping between the two images using the identified points and corresponding points, and transforming the received image using the determined homography mapping to scale, translate, rotate, skew, etc. the received image to correct for differences in camera angle and position. In another embodiment, the normalization may further include adjusting pixel values to correct for differences in color/lighting conditions between the received image and the reference image.

At step 530, the image analysis application 220 detects anomalies based, at least in part, on differences between the normalized images and the corresponding reference images. In one embodiment, the image analysis application 220 compares a normalized image with a corresponding reference image on a block-by-block sliding window basis, as described above with respect to FIG. 4B. In such a case, the image analysis application 220 may first search, in a small area around the location of the block in the normalized image, for a most closely matching block in the reference image. Once such a most closely matching block is found, then the image analysis application 220 compares the normalized image block with the most closely matching block using any suitable technique, such as a normalized cross correlation in the Fourier domain. Anomalies may be detected where, e.g., the normalized cross correlation is below a predefined threshold value. In another embodiment, the image analysis application 220 may subtract the normalized images (e.g., on a block-by-block basis) from their corresponding reference images and detect as anomalies any sufficiently large regions whose pixel values differ by more than a threshold amount to minimize the detection of unwanted noise. In some embodiments, the detection of anomalies may further include applying one or more trained machine learning models to predict classifications of each image region that is different between the normalized and reference images, such as classifications of the different regions as cracks, dents, other surface anomalies, ice build-up, fluid leaks, etc. in images of an aircraft.

At step 540, the image analysis application 220 generates a 3D model of the vehicle using the received images (or the normalized images). In one embodiment, the 3D model is a point cloud generated using the received images through triangulation, as described above. The mapping between the images and the 3D model may be used to, e.g., determine and indicate (in a report) specific locations of detected anomalies on the vehicle.

At step 550, the image analysis application 220 generates and pushes to a handheld device a report indicating the detected anomalies. As a result, a user of the handheld device is notified of the detected anomalies and can take appropriate remedial measures. For example, image(s) showing detected anomalies and their locations (e.g., bounding boxes) on the vehicle (shown using a 3D model) may be included in a report that is pushed to a mobile application running in the user's handheld device. In turn, the mobile application may display the received report including the image(s) and locations of detected anomalies, and the user can then manually locate the anomalies. Additionally, such a report may be generated in real time by the image analysis application 220 as images captured by UAV-mounted cameras are received.

Although described above primarily with respect to vehicles, techniques disclosed herein are also applicable to detect anomalies that may represent damage in images that are captured of other objects (e.g., buildings, roads, etc.). Although described above primarily with respect to cameras, in alternative embodiments, other types of sensors may be used in lieu of or in addition to cameras. For example, LIDAR sensors may be used to capture distance measurements based on the reflections of pulsed laser light. Although described above primarily with respect to comparing normalized images to corresponding reference images, in another embodiment the comparison may be between a constructed 3D model (of a vehicle), such as a point cloud, and a reference 3D model (of the same vehicle) from a previous inspection.

Advantageously, techniques disclosed herein provide an automated and image-based approach for detecting anomalies, including anomalies that appear in images captured of vehicles such as aircraft, trucks, ships, etc. The automated techniques disclosed herein are less labor-intensive than traditional manual inspections and can also be used to inspect parts of vehicles that are not easily reachable by humans.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for performing inspections, the method comprising:
receiving sensor data captured at least by one or more sensors mounted on a first unmanned aerial vehicle (UAV) flying along at least one programmed flight pattern;
normalizing the sensor data; and
determining anomalies based, at least in part, on differences between the normalized sensor data and sensor data previously captured at least by one or more sensors mounted on a second UAV flying along the at least one programmed flight pattern; and
generating a report which indicates the determined anomalies.

2. The method of claim 1, wherein:
the normalized sensor data and the previously captured sensor data include images; and
the determining the anomalies includes comparing matching pixel blocks of the normalized sensor data and the previously captured sensor data.

3. The method of claim 2, wherein the determining the anomalies further includes predicting, using at least one machine learning model, classifications for regions of the normalized sensor data and the previously captured sensor data that differ.

4. The method of claim 1, wherein:
the received sensor data relates to a vehicle; and
the vehicle is one of an aircraft, a truck, or a ship.

5. The method of claim 4, wherein each of the at least one programmed flight pattern includes predefined angles, distances, and routes to fly with respect to the vehicle.

6. The method of claim 4, wherein the at least one programmed flight pattern is selected based, at least in part, on a type of the vehicle.

7. The method of claim 4, wherein the first UAV flies from a deployment location to the vehicle according to a programmed flight path determined based, at least in part, on a location of the vehicle.

8. The method of claim 4, wherein the received sensor data further includes sensor data captured by at least one of a sensor under the vehicle or a sensor array across which the vehicle passes.

9. The method of claim 1, wherein the at least one sensor includes at least one of an optical camera, an ultrasonic camera, a thermal camera, an ultraviolet light camera, or a LIDAR sensor.

10. The method of claim 1, further comprising:
generating a 3D model based, at least in part, on the received sensor data or the normalized sensor data,
wherein the report is generated using the 3D model.

11. The method of claim 1, wherein the first and the second UAVs are the same UAV.

12. A non-transitory computer-readable storage medium comprising instructions executable by a computer, the computer having one or more physical central processing units (CPUs), wherein the instructions, when executed, cause the computer to perform a method for performing inspections, the method comprising:
receiving sensor data captured at least by one or more sensors mounted on a first unmanned aerial vehicle (UAV) flying along at least one programmed flight pattern;
normalizing the sensor data; and determining anomalies based, at least in part, on differences between the normalized sensor data and sensor data previously captured at least by one or more sensors mounted on a second UAV flying along the at least one programmed flight pattern; and generating a report which indicates the determined anomalies.

13. The computer-readable storage medium of claim 12, wherein:

the normalized sensor data and the previously captured sensor data include images; and the determining the anomalies includes comparing matching pixel blocks of the normalized sensor data and the previously captured sensor data.

14. The computer-readable storage medium of claim 13, wherein the determining the anomalies further includes predicting, using at least one machine learning model, classifications for regions of the normalized sensor data and the previously captured sensor data that differ.

15. The computer-readable storage medium of claim 12, wherein:

the received sensor data relates to a vehicle;

the vehicle is one of an aircraft, a truck, or a ship; and each of the at least one programmed flight pattern includes predefined angles, distances, and routes to fly with respect to the vehicle.

16. The computer-readable storage medium of claim 15, wherein:

the at least one programmed flight pattern is selected based, at least in part, on a type of the vehicle; and the first UAV flies from a deployment location to the vehicle according to a programmed flight path determined based, at least in part, on a location of the vehicle.

17. The computer-readable storage medium of claim 15, wherein the received sensor data further includes sensor data captured by at least one of a sensor under the vehicle or a sensor array across which the vehicle passes.

18. The computer-readable storage medium of claim 12, wherein the at least one sensor includes at least one of an optical camera, an ultrasonic camera, a thermal camera, an ultraviolet light camera, or a LIDAR sensor.

19. The computer-readable storage medium of claim 12, wherein the first and the second UAVs are the same UAV.

20. A computer system, comprising:

one or more processors;

a memory, wherein the memory includes an application program configured to perform operations for performing inspections, the operations comprising:

receiving sensor data captured at least by one or more sensors mounted on a first unmanned aerial vehicle (UAV) flying along at least one programmed flight pattern, normalizing the sensor data, determining anomalies based, at least in part, on differences between the normalized sensor data and sensor data previously captured at least by one or more sensors mounted on a second UAV flying along the at least one programmed flight pattern, and generating a report which indicates the determined anomalies.

21. The method of claim 4, wherein the vehicle makes at least one trip after the second UAV flying along the at least one programmed flight pattern and prior to being inspected by the first unmanned aerial vehicle (UAV) flying along at least one programmed flight pattern.

\* \* \* \* \*